(12) United States Patent
Valdez-Gibson

(10) Patent No.: US 10,966,463 B2
(45) Date of Patent: Apr. 6, 2021

(54) ELECTRONIC CIGARETTE PHONE CASE WITH BATTERY

(71) Applicant: Marlon Valdez-Gibson, Jacksonville, FL (US)

(72) Inventor: Marlon Valdez-Gibson, Jacksonville, FL (US)

( * ) Notice: Subject to any disclaimer, the term of this patent is extended or adjusted under 35 U.S.C. 154(b) by 423 days.

(21) Appl. No.: 15/922,403

(22) Filed: Mar. 15, 2018

(65) Prior Publication Data

US 2019/0281893 A1 Sep. 19, 2019

(51) Int. Cl.
| | | |
|---|---|---|
| *H04M 1/00* | (2006.01) | |
| *A24F 47/00* | (2020.01) | |
| *A24F 15/18* | (2006.01) | |
| *H04M 1/21* | (2006.01) | |
| *H04M 1/18* | (2006.01) | |
| *H04B 1/3888* | (2015.01) | |

(52) U.S. Cl.
CPC ............ *A24F 47/008* (2013.01); *A24F 15/18* (2013.01); *H04B 1/3888* (2013.01); *H04M 1/185* (2013.01); *H04M 1/21* (2013.01)

(58) Field of Classification Search
CPC ...... H04M 1/185; H04M 1/21; H04M 1/0283; H04M 1/18; H04B 1/3888
USPC ...................................................... 455/575.8
See application file for complete search history.

(56) References Cited

U.S. PATENT DOCUMENTS

| | | | | |
|---|---|---|---|---|
| 8,774,446 | B2* | 7/2014 | Merenda | H05K 5/0086 |
| | | | | 381/395 |
| 9,433,242 | B1* | 9/2016 | Buffone | A24F 15/18 |
| 9,602,646 | B2 | 3/2017 | Stanimirovic | |
| 10,111,464 | B1* | 10/2018 | Balder | A61M 15/0021 |
| 2015/0014213 | A1* | 1/2015 | Merenda | A45C 11/00 |
| | | | | 206/581 |
| 2015/0018056 | A1* | 1/2015 | Gillikin | H04M 1/04 |
| | | | | 455/575.8 |
| 2015/0101940 | A1* | 4/2015 | Ash | A24F 47/00 |
| | | | | 206/216 |
| 2015/0215439 | A1* | 7/2015 | Stanimirovic | A24F 40/40 |
| | | | | 455/572 |
| 2015/0365756 | A1* | 12/2015 | Merenda | A45C 15/00 |
| | | | | 381/375 |
| 2015/0366268 | A1* | 12/2015 | Shabat | A24F 15/01 |
| | | | | 131/329 |
| 2016/0080535 | A1* | 3/2016 | Stanimirovic | H04M 1/215 |
| | | | | 455/575.8 |
| 2016/0331035 | A1* | 11/2016 | Cameron | A24F 40/65 |
| 2016/0345628 | A1* | 12/2016 | Sabet | A24F 40/40 |
| 2017/0196270 | A1* | 7/2017 | Vick | H02J 7/0042 |
| 2017/0215293 | A1* | 7/2017 | Merenda | A45C 13/02 |
| 2017/0302324 | A1* | 10/2017 | Stanimirovic | A24F 47/008 |
| 2017/0331932 | A1* | 11/2017 | Newman | H04B 1/3888 |
| 2017/0360090 | A1* | 12/2017 | Grossfeld | A24F 47/008 |

(Continued)

*Primary Examiner* — April G Gonzales
(74) *Attorney, Agent, or Firm* — Mitchell Ghaneie

(57) ABSTRACT

This invention is an e-cigarette phone case and battery that allows for powering a filter component of an e-cigarette while also recharging the battery component of the e-cigarette. This invention may also be used with powering the filter component and the battery component of a vape pen or other similar nicotine or non-nicotine delivery devise. This invention may also be used for recharging a phone or other mobile electronic communication device secured within the case.

22 Claims, 6 Drawing Sheets

(56) References Cited

U.S. PATENT DOCUMENTS

2018/0110258 A1\* 4/2018 Balder .................. A24F 1/00
2018/0153209 A1\* 6/2018 Balder .................. A24F 40/42

\* cited by examiner

ELECTRONIC CIGARETTE PHONE CASE WITH BATTERY

BACKGROUND OF THE INVENTION

A. Field of the Invention

This invention relates to a case for a mobile electronic device, which is to be used with an e-cigarette or other vaporizing device used for inhaling nicotine or THC.

B. Prior Art

Electronic cigarettes, also referred to as e-cigarettes, and vaporizers are becoming very popular as an alternative to traditional tobacco products such as cigarettes, cigars, and cigarillos. The benefit of using an e-cigarette, vape pen or other similar electronic nicotine or non-nicotine delivery system is that they each are tobacco free. With e-cigarettes and vaporizers, a battery is provided as the power source for heating a liquid, which contains nicotine, into a vapor for inhalation by an individual. An issue with these devices is that they are often used regularly throughout a day and the battery cannot provide adequate power for the desired duration of use. Thus, the user must stop use and recharge the battery or ensure that he or she has additional batteries to replace the spent batteries. Furthermore, the user would need a secure place to store the extra batteries or spent batteries.

Electronic mobile communication device cases have been provided to store e-cigarette components. However, those cases are distinguished from the claimed invention in that the claimed invention allows an individual to use the filter component of an e-cigarette and connect it to the case for use. The claimed invention additionally allows the user to plug the spent battery into the case for recharging while the filter is in use. In other words, the claimed invention allows the user to inhale a vaporized nicotine solution from the filter component of an e-cigarette while the battery component of the e-cigarette is charging within the case. Accordingly, the user can maintain use of his or her e-cigarette or vape pen.

BRIEF SUMMARY OF THE INVENTION

This invention is a phone case that provides the ability to smoke or inhale out of the filter component of an e-cigarette while also charging the battery component of the e-cigarette. The front of the case is intended to securely hold a mobile electronic communication device, such as, but not limited to, a phone. The front of the case additionally provides a power connector for attaching to the mobile electronic communication device. The back of the case provides a first opening and a second opening for accepting the filter component and the battery component of an e-cigarette respectively. Within the back of the case is also at least one battery.

The embodiments described herein provides at least one internal battery within the back of the case and is utilized to power the heating element within the filter component, charge the battery component of the e-cigarette, charge the electronic mobile communication device through the power connector, or all three. The case is thicker in certain areas to accommodate the one or more internal batteries, filter component, and battery component within the case and provides rounded corners to comfortably fit in a user's pocket. The rounded corners also enable a user to securely hold the case while using the electronic communication mobile device safeguarded within it or the filter component while it is connected. It is anticipated that one rechargeable battery may be provided within the back of the case instead of two.

The first opening provides internal threads for accepting the filter component and beneath the second opening is a chamber that can house or hold the battery component of the e-cigarette. At the end of the chamber opposite the second opening, is a connector that allows for transferring power from the internal case battery to the e-cigarette battery component.

Not all electronic cigarettes connect the filter component to the battery component with male and female threads. Accordingly, it is anticipated that a plurality of adapters may be used with the phone case to allow for various brands of electronic cigarettes or other non-nicotine delivery devices to attach to the case.

A charge port and function control button are also provided within the case. The charge port allows for charging the internal batteries from an external power source. The function control button allows for turning the invention on to power a filter component, recharge a battery component of an e-cigarette, recharge the phone battery, or all three. The function control button may also be used to control the various features of the device, for example, to supply power to the filter component and recharge the battery component, but not recharge the battery of a phone secured within the case.

It is also anticipated that battery status indicators will be provided within the case to indicate the charge left within the internal case batteries. With the first embodiment, the battery status indicators may be, but not limited to, a plurality of LED lights. Within the plurality of LED lights is a series of LED lights that are illuminated when the case battery is at full charge. As the case battery loses charge, the LED lights within the series will turn off accordingly. For instance, if four LED lights are provided and only three are illuminated, then the battery is seventy-five percent charged.

An alternative embodiment is anticipated to provide a screen, a directional pad ("d-pad"), and a function control button. The screen and directional pad are intended to allow a user to make settings on what liquid is being vaporized and adjusting the power output accordingly. The screen will also display a battery life indicator for the user to know the charge left within the internal battery or batteries and the type of liquid being atomized within the filter when the heating element is activated.

NUMBERING REFERENCE

Figure 1:
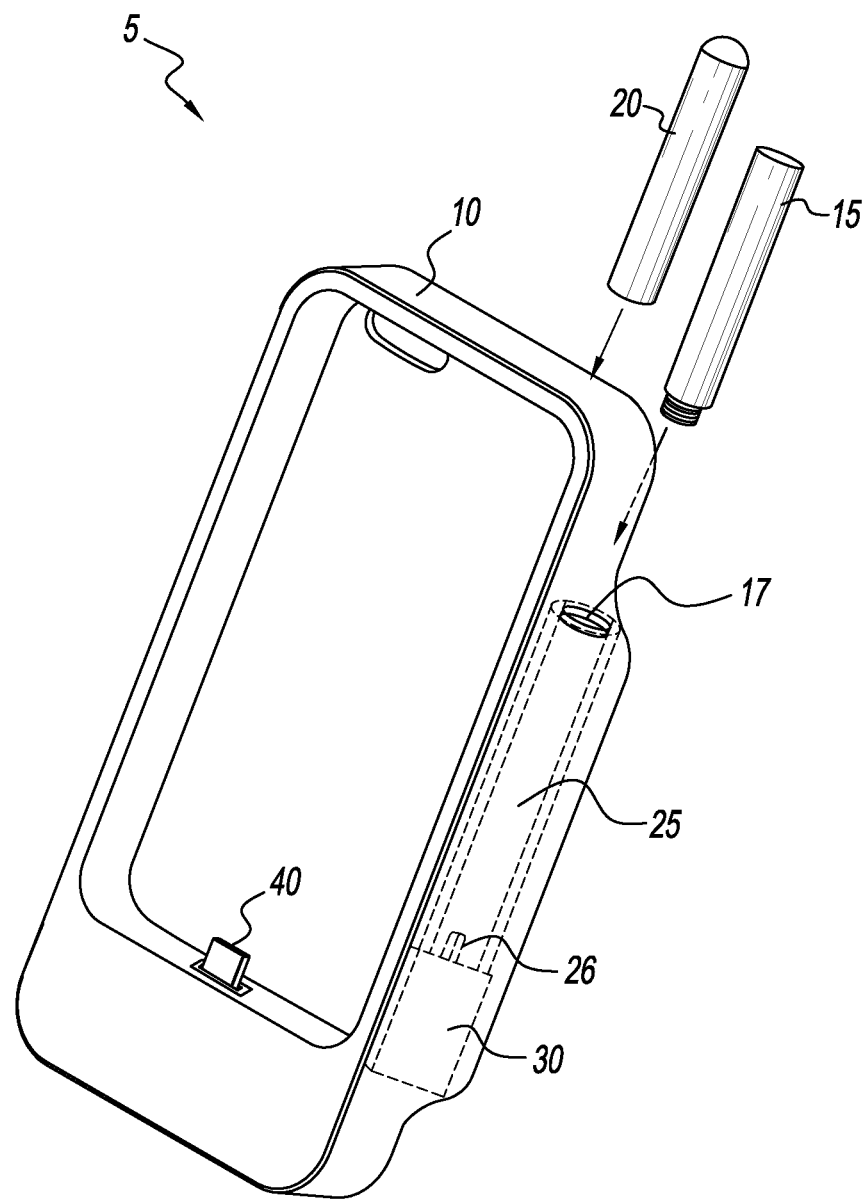
FIG. 1 is a front isometric view of the device showing the power connector near the bottom of the case, the filter component of the e-cigarette, and the battery component of the e-cigarette. This FIG. 1 additionally shows broken lines representing an embodiment where a second internal case battery is connected to a first internal case battery.

5—Invention
10—Case
15—Filter component of e-cigarette
17a—First opening
17b—Female threaded connector
20—Battery component of e-cigarette
21—Second opening
22—Chamber
23—Male threaded connector
25—First internal case battery
26—battery connector
30—Second internal case battery
35—LED indicator light
40—power connector
45—Charge port
50—Function control button
55—Screen
60—Directional pad
65—Plurality of adapters

DETAILED DESCRIPTION OF THE EMBODIMENTS

This invention 5 is an e-cigarette phone case with at least one battery that an individual may use to extend the enjoyment of an e-cigarette, vape pen, or other similar vaporizer device when the battery component 20 loses charge by powering the filter component 15 and recharging the battery component 20. This invention 5 is described below in two embodiments.

First Embodiment

This first embodiment is comprised of a case 10, a first opening 17a, a second opening 21, a chamber 22, a female threaded connector 17b, a male threaded connector 23, a battery connector 26, a first internal case battery 25, a second internal case battery 30, a plurality of LED indicator lights 35, a charge port 45, and a function control button 50. The invention 5 is further comprised of a power connector 40 and a plurality of adapters 65. While the case 10 is titled and described in detail as being used for a phone, the case 10 may be modified to alternatively hold and protect a tablet or other mobile electronic communication device. Furthermore, this invention 5 is titled and described in detail as being used with an e-cigarette, but may alternatively be used with a vape pen or any other similar electronic nicotine delivery system (ENDS), electronic non-nicotine delivery system (ENNDS), or personal vaporizer.

A typical e-cigarette is comprised of a filter component 15 and a battery component 20. The filter component 15 provides a first end, a second end, a liquid, and a heating element or atomizer. The first end of the filter component 15 provides male threads and the second end of the filter component 15 provides a plurality of holes. When powered, the heating element heats the liquid to transition into a vapor to then be inhaled by a user. It is typical for the heating element to be powered when a button is pushed or a pressure sensor is activated by inhaling. The battery component 20 also has a first end and second end. The first end of the battery component 20 provides female threads that mate with the male threads of the filter component 15. The second end of the battery component 20 provides a light.

Figure 2:
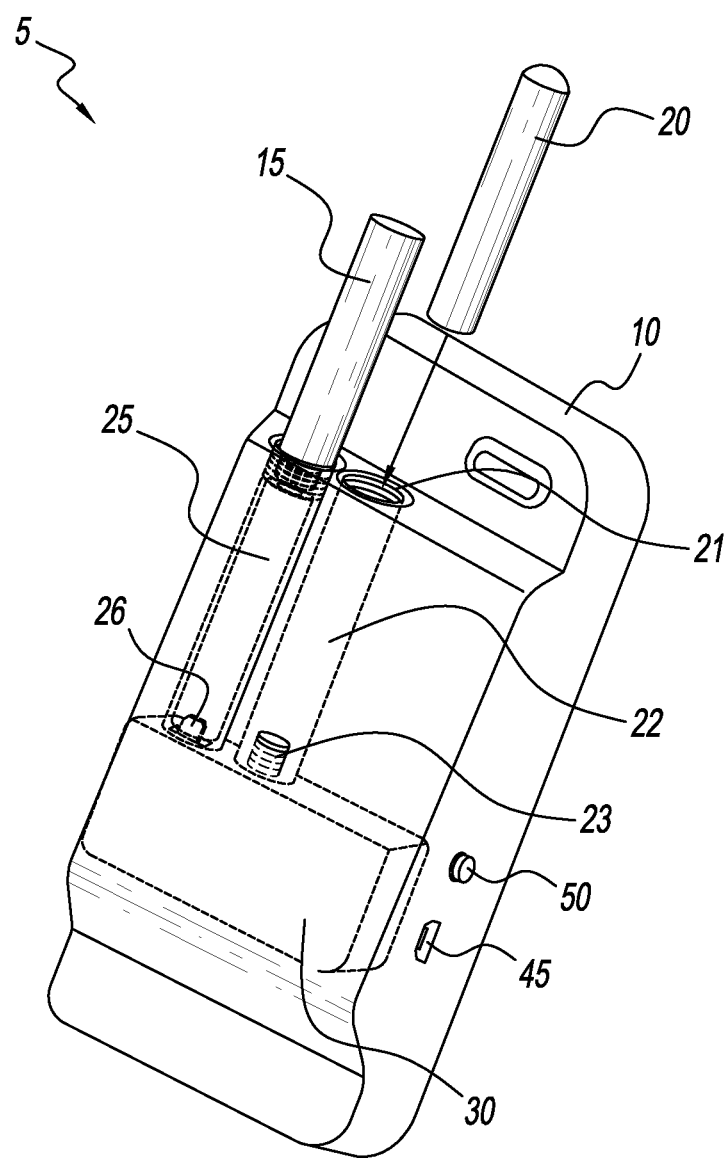
FIG. 2 is a back isometric view of the device showing the filter component of the electronic cigarette connected to the case and the battery component of the electronic cigarette elevated above the case. This figure also shows the first internal case battery connected to the filter component as well as the second internal case battery connected to the battery connector and the male-threaded connector.

The case 10 has a front side, a back side, a first side and a second side. The front side of the case 10 accepts a phone or other mobile electronic communication device and protects the phone from unintentional drops or damage. The back side of the case 10 provides a first opening 17a and a second opening 21. The first opening 17a provides a female threaded connector 17b that accepts the first end of the filter component 15. The first end of the battery component 20 can be placed through the second opening 21 and into the chamber 22. A male threaded connector 23 is provided at the bottom of the chamber as shown in FIG. 2 and connects to the first end of the battery component 20 shown in FIG. 1, FIG. 2, and FIG. 3.

Figure 3:
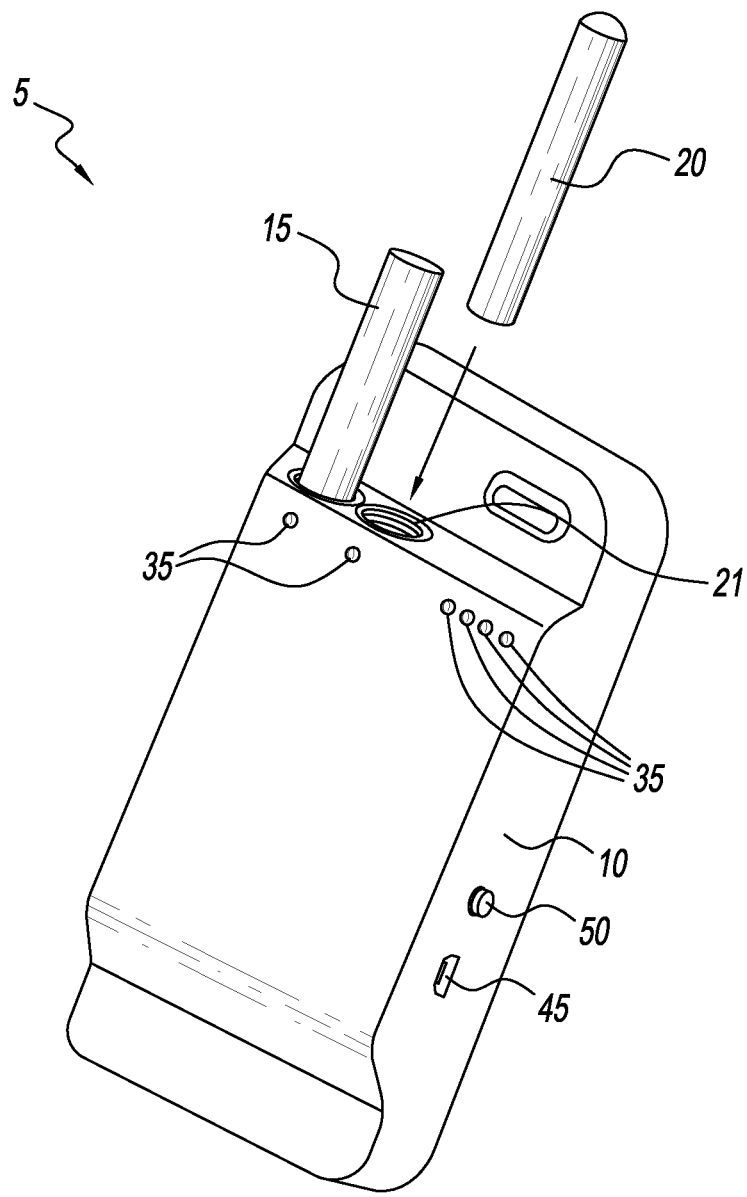
FIG. 3 is a back isometric view of the device showing the filter component connected to the case and the battery component elevated above the case. This figure also shows the opening in the chamber that the battery component is placed into and a plurality of LED battery indicator lights.
Figure 4:
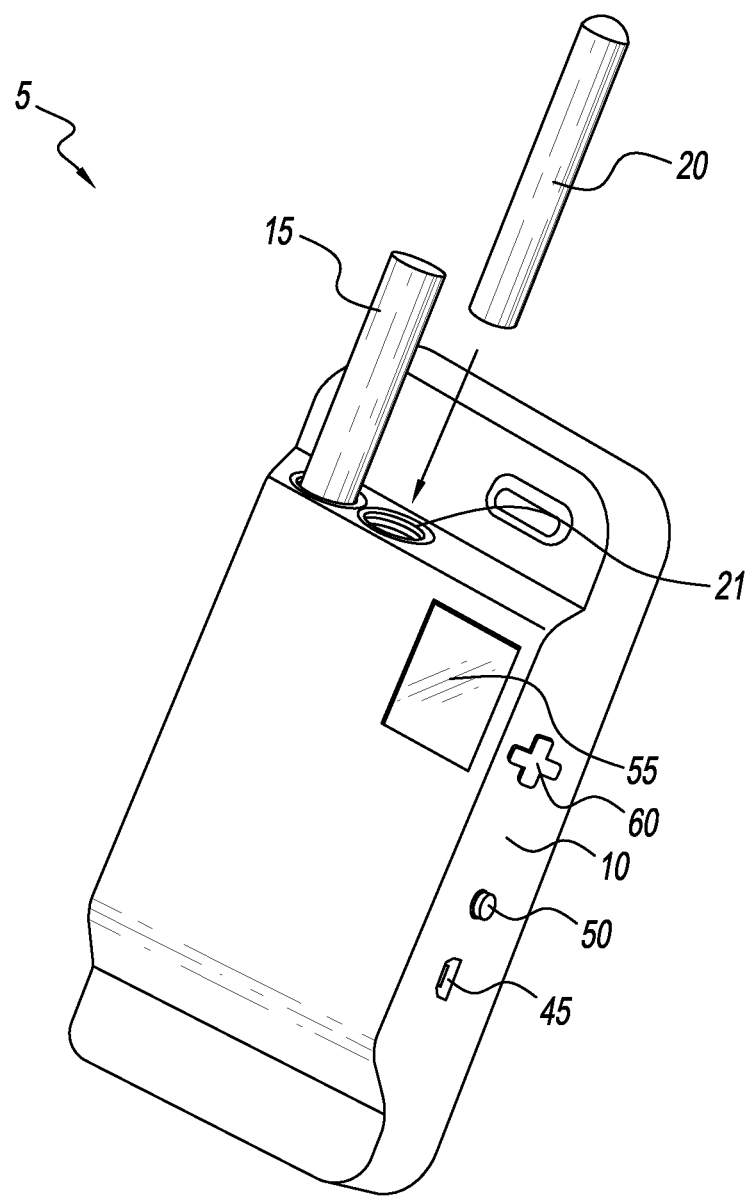
FIG. 4 is a back isometric view of a second embodiment showing the filter component connected to the case and the battery component elevated above the case. This figure also shows the opening in the chamber that the battery component is placed into, a screen on the back side of the case, and a directional pad on the side of the case.
Figure 5:
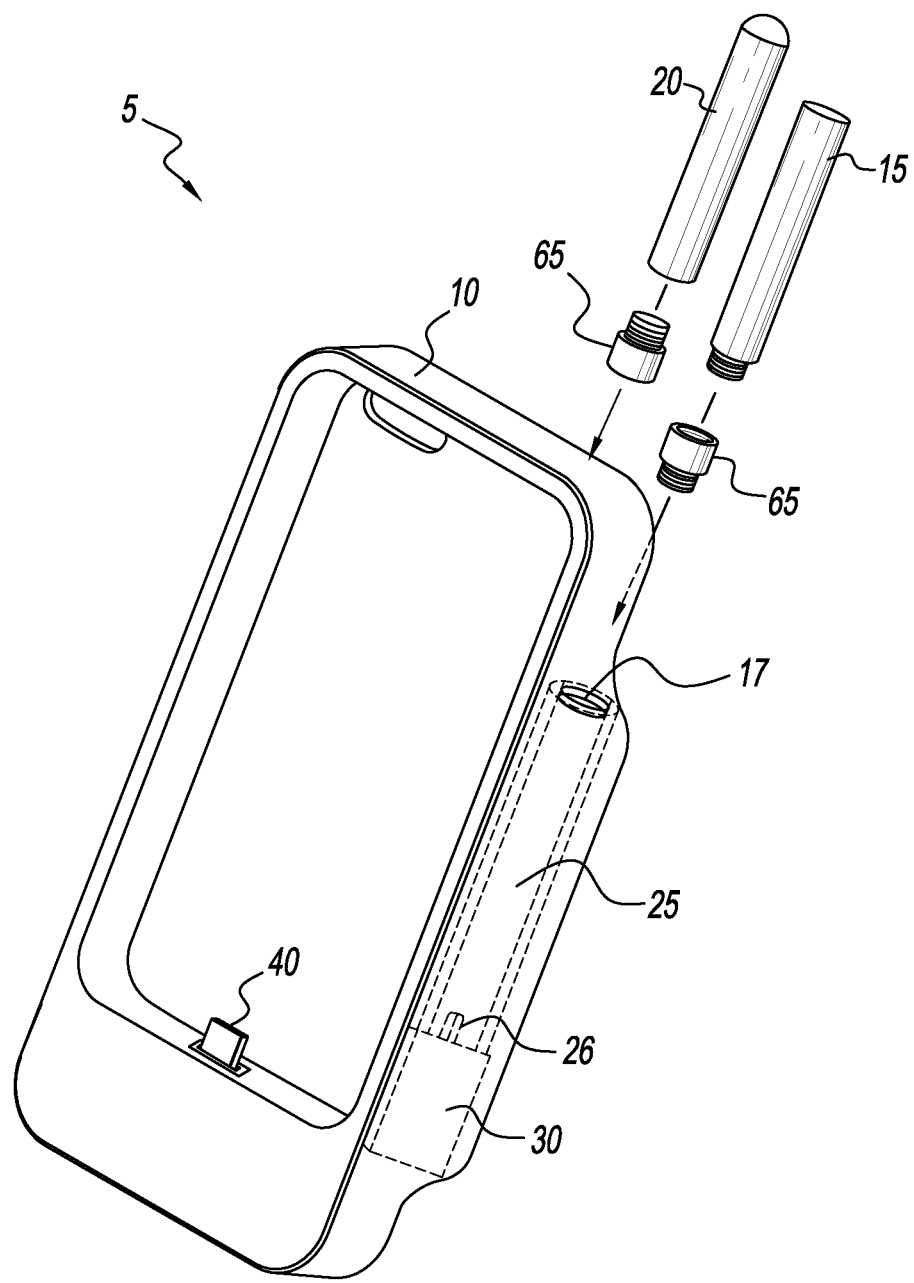
FIG. 5 is a front isometric view of the second embodiment showing an adapter for the connection of the filter component and an adapter for the connection of the battery component to connect to the phone case.
Figure 6:
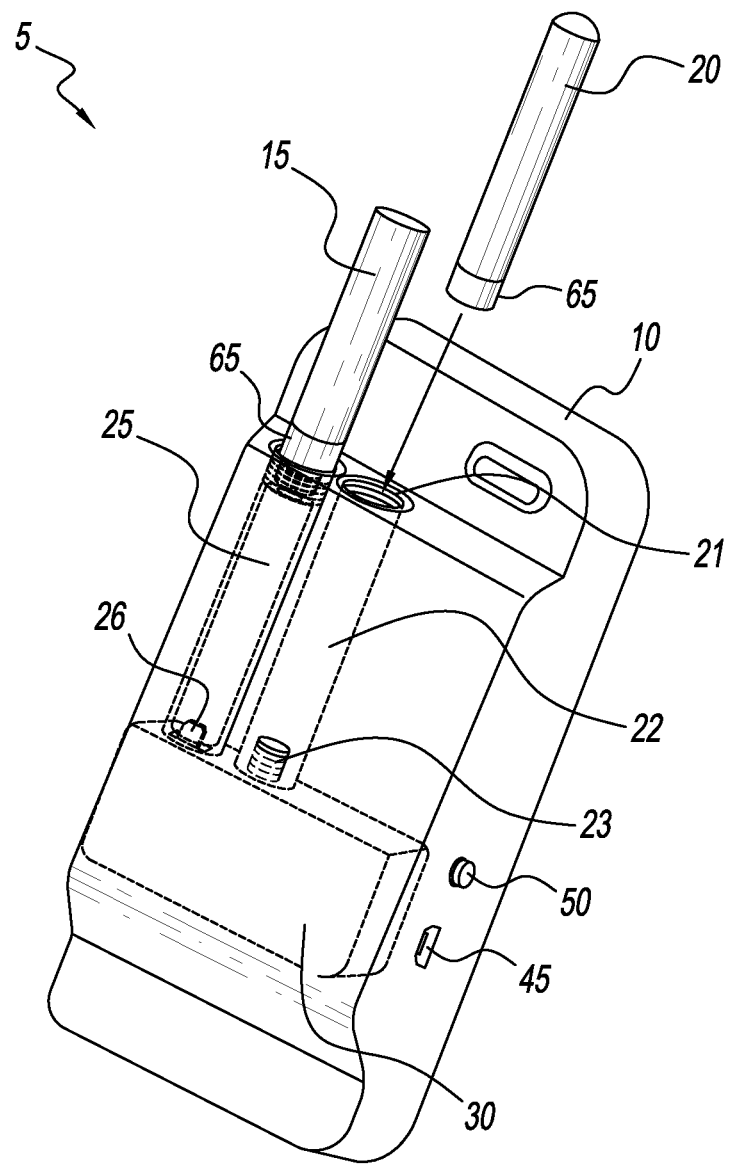
FIG. 6 is a back isometric view of the second embodiment showing the adapters connected to the filter component and the battery component of the electronic cigarette.

In addition, the back side of the case 10 houses the first internal case battery 25 and the second internal case battery 30. The first internal case battery 25 is connected to the female threaded connector 17b. The second internal case battery 30 is connected to the male threaded connector 23. The second internal case battery 30 and first internal case battery 25 are connected as well with a battery connector 26. The first internal case battery 25 and second internal case battery 30 are connected to the charge port 45 and can be turned on and off with the function control button 50. The function control button 50 and charge port 45 are provided on the first side of the case 10 as shown in FIG. 2 and FIG. 3.

When the user desires, he or she may connect the filter component 15 to the female threaded connector 17b. Once the filter component 15 is connected to the female threaded connector 17b and the filter component 15 is powered by the first internal case battery 25 or second internal case battery 30, the user of the invention 5 may place his or her lips over the second end of the filter component 15 and inhale. While power is being provided to the filter component 15 and the user is inhaling, the heating element heats the liquid within the filter component 15 into a vapor. Depending on the type of ENDS the user may be required to press a button on the filter component 15 while inhaling for the liquid within the filter component 15 to be vaporized or atomized.

While the filter component 15 is being utilized or powered, the battery component 20 may also be charging in the chamber 22 by being connected to the male threaded connector 23. Thus, the case 10 may operate as a temporary power source for the filter component 15, until the battery component 20 is recharged. Once the battery component 20 is recharged it can be disconnected from the male threaded connector 23, the filter component 15 can be unconnected from the female threaded connector 17b, and the filter component 15 can be connected to the battery component 20.

This invention 5 also provides LED indicator lights 35. An indicator light 35 is provided for indicating when the filter component 15 is being powered by either the first internal case battery 25 or the second internal case battery 30. An indicator light 35 is provided for indicating when the battery component 20 is being recharged by either the first internal case battery 25 or the second internal case battery 30. A series of indicator lights 35 are also provided on the back side of the case 10 for showing the remaining total charge left in the first internal case battery 25 and second internal case battery 30.

The front side of the case 10 additionally provides a power connector 40. The power connector 40 plugs into or otherwise connects to the phone secured into the case 10. The power connector also connects to the second internal case battery 30. Thus, the second internal case battery 30 may provide power to the phone and recharge the phone battery.

It is anticipated that an internal controller component can be provided within the case 10 and is connected to the function control button 50. It is further anticipated that the internal controller component may be used to change the color of the indicator lights 35 when the battery component 20 of the e-cigarette is fully charged. The internal controller component may allow the user to determine which connector to power within the case. It is also anticipated that a plurality of function control buttons 50 can be provided on the case.

With regard to the one or more internal case batteries, while the disclosed embodiment describes a first internal case battery 25 and a second internal case battery 30 being used, it is anticipated that only one battery may be used to power the filter component 15 through the female threaded connector 17b, recharge the battery component 20 through the male threaded connector 23, recharge the phone battery through the power connector 40, or any combination of all three.

Second Embodiment

This second embodiment is comprised of a case 10, a first opening 17a, a second opening 21, a chamber 22, a female threaded connector 17b, a male threaded connector 23, a battery connector 26, a first internal case battery 25, a second internal case battery 30, a screen 55, a charge port 45, a function control button 50, a directional pad 60. The second embodiment is further comprised of a power connector 4040 and a plurality of adapters 65.

This screen 55 and directional pad 60 in the second embodiment are used as an alternative to the LED lights 35 described in the first embodiment. However, it is anticipated that the screen 55 and directional pad 60 could be used in addition to the LED lights 35. The screen 55 displays the available charge left within the first and second internal case batteries and the type of liquid being atomized in the filter component 15. The screen may additionally or alternatively display the amps, voltage, wattage or all three. The heating element in the filter component 15 requires a specific amount of energy that depends on the liquid that is to be atomized. The directional pad 60 allows for selecting the type of liquid to be atomized within the screen 55, which in turn adjusts the power used from the first internal case battery 25 and second internal case battery 30. The directional pad 60 alternatively may be used for adjusting the voltage or wattage, if necessary, for a variety of liquids to be atomized.

It is anticipated that a control module is connected to the screen 55 by the female threaded connector 17b, the male threaded connector 23, the directional pad 60, the function control button 50, the first internal case battery 25 and the second internal case battery 30.

While the embodiments of the invention 5 have been disclosed, certain modifications may be made by those skilled in the art to modify the invention 5 without departing from the spirit of the invention 5.

The inventor claims:

1. An electronic cigarette phone case that is comprised of:
   a. a front side;
      wherein an electronic mobile communication device is held within the front side;
      wherein the electronic mobile device is removable from the front side;
   b. a back side;
      wherein a first opening is provided;
      wherein a female threaded connector is provided within the first opening;
      wherein a chamber is provided;
      wherein the chamber provides a first end and a second end;
      wherein a second opening is provided at the first end of the chamber;
      wherein a male threaded connector is provided at the second end of the chamber;
      wherein the back side houses at least one internal battery;
      wherein the at least one internal battery is connected to the female threaded connector;
      wherein the back side accepts one or more components of an electronic cigarette;
      wherein the one or more components of the electronic cigarette comprise a filter component and a battery component;
      wherein the filter component comprises a heating element;
      wherein the heating element is powered by the at least one internal battery through the female threaded connector;
      wherein the at least one internal battery is connected to the male threaded connector;
      wherein the battery component of the electronic cigarette is charged within the chamber through the male threaded connector;
      wherein the heating element is operable without the filter component being connected to the battery component;
      wherein a plurality of indicator lights are provided on the back side;
      wherein the plurality of indicator lights are connected to the internal battery;
      wherein a control module is housed within the back side;
   c. a first side;
      wherein a charge port is provided on the first side;
      wherein the charge port is connected to the internal battery;
      wherein a function control button is provided on the first side;
      wherein the function control button is connected to the control module;
   d. a second side;
      wherein the second side opposes the first side.

2. The electronic cigarette phone case as described in claim 1, wherein a first internal battery and a second internal battery are housed within the back side of the electronic cigarette phone case.

3. The electronic cigarette phone case as described in claim 2, wherein the first internal battery and second internal battery is recharged through the charge port.

4. The electronic cigarette phone case as described in claim 1, wherein the first internal battery is connected to the second internal battery.

5. The electronic cigarette phone case as described in claim 1, wherein a power connector is provided on the front side.

6. The electronic cigarette phone case as described in claim 5, wherein the power connector is connected to the at least one internal battery.

7. The electronic cigarette phone case as described in claim 1, wherein the control module is connected to the at least one battery, the function control button, the charge port, the plurality of LED lights, the male threaded connector, and the female threaded connector.

8. The electronic cigarette phone case as described in claim 1, wherein a plurality of adapters for the filter component and the battery component are provided.

9. An electronic cigarette phone case that is comprised of:
 a. a front side;
  wherein an electronic mobile communication device is held within the front side;
  wherein the electronic mobile device is removable from the front side;
 b. a back side;
  wherein a first opening is provided;
  wherein a female threaded connector is provided within the first opening;
  wherein a chamber is provided;
  wherein the chamber provides a first end and a second end;
  wherein a second opening is provided at the first end of the chamber;
  wherein a male threaded connector is provided at the second end of the chamber;
  wherein the back side houses at least one internal battery;
  wherein the at least one internal battery is connected to the female threaded connector;
  wherein the back side accepts one or more components of an electronic cigarette;
  wherein the one or more components of the electronic cigarette comprise a filter component and a battery component;
  wherein the filter component comprises a heating element;
  wherein the heating element is powered by the at least one internal battery through the female threaded connector;
  wherein the at least one internal battery is connected to the male threaded connector;
  wherein the battery component of the electronic cigarette is charged within the chamber through the male threaded connector;
  wherein the heating element is operable without the filter component being connected to the battery component;
  wherein a display screen is provided on the back side;
  wherein the display screen is connected to the at least one internal battery;
  wherein a control module is housed within the back side;
 c. a first side;
  wherein a charge port is provided on the first side;
  wherein the charge port is connected to the internal battery;
  wherein a function control button is provided on the first side;
  wherein the function control button is connected to the control module;
  wherein a directional pad is provided on the first side;
  wherein the directional pad is connected to the control module;
 d. a second side;
  wherein the second side opposes the first side.

10. The electronic cigarette phone case as described in claim 9, wherein a first internal battery and a second internal battery are housed within the back side of the electronic cigarette phone case.

11. The electronic cigarette phone case as described in claim 10, wherein the first internal battery and second internal battery is recharged through the charge port.

12. The electronic cigarette phone case as described in claim 9, wherein the first internal battery is connected to the second internal battery.

13. The electronic cigarette phone case as described in claim 10, wherein a power connector is provided on the front side.

14. The electronic cigarette phone case as described in claim 13, wherein the power connector is connected to the at least one internal battery.

15. The electronic cigarette phone case as described in claim 9, wherein the control module is connected to the at least one battery, the function control button, the charge port, the display screen, the directional pad, the male threaded connector, and the female threaded connector.

16. The electronic cigarette phone case as described in claim 9, wherein a plurality of adapters for the filter component and the battery component are provided.

17. An electronic cigarette phone case that is comprised of:
 a. a front side;
  wherein an electronic mobile communication device is held within the front side;
  wherein the electronic mobile device is removable from the front side;
 b. a back side;
  wherein a first opening is provided;
  wherein a female threaded connector is provided within the first opening;
  wherein a chamber is provided;
  wherein the chamber provides a first end and a second end;
  wherein a second opening is provided at the first end of the chamber;
  wherein a male threaded connector is provided at the second end of the chamber;
  wherein the back side houses at least one internal battery;
  wherein the at least one internal battery is connected to the female threaded connector;
  wherein the back side accepts one or more components of an electronic cigarette;
  wherein the one or more components of the electronic cigarette comprise a filter component and a battery component;
  wherein the filter component comprises a heating element;
  wherein the heating element is powered by the at least one internal battery through the female threaded connector;
  wherein the at least one internal battery is connected to the male threaded connector;

wherein the battery component of the electronic cigarette is charged within the chamber through the male threaded connector;
wherein the heating element is operable without the filter component being connected to the battery component;
wherein a display screen is provided on the back side;
wherein the display screen is connected to the at least one internal battery;
wherein a plurality of indicator lights is provided on the back side;
wherein the plurality of indicator lights is connected to the control module;
wherein a control module is housed within the back side;

c. a first side;
wherein a charge port is provided on the first side;
wherein the charge port is connected to the internal battery;
wherein a function control button is provided on the first side;
wherein the function control button is connected to the control module;
wherein a directional pad is provided on the first side;
wherein the directional pad is connected to the control module;

d. a second side;
wherein the second side opposes the first side.

18. The electronic cigarette phone case as described in claim 17, wherein a power connector is provided on the front side.

19. The electronic cigarette phone case as described in claim 18, wherein the power connector is connected to the at least one internal battery.

20. The electronic cigarette phone case as described in claim 17, wherein the internal battery is recharged through the charge port.

21. The electronic cigarette phone case as described in claim 17, wherein the control module is connected to the at least one battery, the function control button, the charge port, the display screen, the directional pad, the male threaded connector, and the female threaded connector.

22. The electronic cigarette phone case as described in claim 17, wherein a plurality of adapters for the filter component and the battery component are provided.

* * * * *